(12) United States Patent
Dahl et al.

(10) Patent No.: US 6,896,452 B2
(45) Date of Patent: May 24, 2005

(54) METHOD OF MILLING ENGINE BLOCKS

(75) Inventors: Katarina Dahl, Sandviken (SE); Ingemar Hessman, Sandviken (SE)

(73) Assignee: Sandvik AB, Sandviken (SE)

( * ) Notice: Subject to any disclaimer, the term of this patent is extended or adjusted under 35 U.S.C. 154(b) by 0 days.

(21) Appl. No.: 09/987,941

(22) Filed: Nov. 16, 2001

(65) Prior Publication Data
US 2002/0076286 A1 Jun. 20, 2002

(30) Foreign Application Priority Data
Nov. 22, 2000 (SE) .............................................. 0004274

(51) Int. Cl.$^7$ ................................................ B23C 3/00
(52) U.S. Cl. ..................................... 409/132; 407/119
(58) Field of Search ............................... 409/131–132; 407/119; 82/1.11

(56) References Cited

U.S. PATENT DOCUMENTS

| | | | | |
|---|---|---|---|---|
| 4,227,842 A | * | 10/1980 | Samanta et al. | 409/131 |
| 4,286,905 A | * | 9/1981 | Samanta | 409/132 |
| 4,961,757 A | * | 10/1990 | Rhodes et al. | 51/309 |
| 5,296,008 A | * | 3/1994 | Moriguchi et al. | 51/295 |
| 5,382,273 A | * | 1/1995 | Mehrotra et al. | 51/307 |
| 5,655,860 A | * | 8/1997 | Oles | 409/132 |
| 5,672,031 A | * | 9/1997 | Oles | 407/119 |
| 6,610,113 B1 | * | 8/2003 | Mehrotra et al. | 407/119 |
| 2002/0107135 A1 | * | 8/2002 | Roy et al. | 501/98.2 |

FOREIGN PATENT DOCUMENTS

| | | |
|---|---|---|
| CA | 1336101 | 6/1995 |
| JP | 57111280 A | 7/1982 |
| JP | 59217676 A | 12/1984 |

OTHER PUBLICATIONS

Oberg et al., Machinery's Handbook, 25$^{th}$ ed., 1996, Industrial Press Inc., pp. 752–753 and 972–1023.*
ASM Handbook, vol. 20, Materials Selection and Design, ASM International, 1997, pp. 378–379.*
"Fix–Perfect Cast Iron Milling", printout from www.kennametal.com, printed Nov. 14, 2002, 3 pages.*
Arnold, "Trends that Drive Cutting Tool Development", 2000, 7 pages.*
Freitag et al., "Opportunites for Advanced Ceramics to Meet the Needs to the Industries of the Future", Dec. 1998, pp. 2-1 throug 2–6.*
Metals Handbook Desk Edition, Second Edition, *ASM International*, Materials Park, Ohio, 1998, pp. 14, 307–314.
Derwent Abstracts, JP 49113803, Oct. 30, 1974.

* cited by examiner

*Primary Examiner*—Erica Cadugan
(74) *Attorney, Agent, or Firm*—Burns, Doane, Swecker & Mathis, L.L.P.

(57) ABSTRACT

The present invention relates to a method of milling a material comprising aluminum and cast iron. By using a silicon nitride based cutting tool insert at a cutting speed of more than 1000 m/min, an unexpected increase in tool life has been obtained.

4 Claims, No Drawings

METHOD OF MILLING ENGINE BLOCKS

FIELD OF THE INVENTION

The present invention relates to high speed milling of engine blocks comprising aluminum and cast iron. More particularly, the present invention relates to a method of high speed milling of engine blocks.

BACKGROUND OF THE INVENTION

In the description of the background of the present invention that follows reference is made to certain structures and methods, however, such references should not necessarily be construed as an admission that these structures and methods qualify as prior art under the applicable statutory provisions. Applicants reserve the right to demonstrate that any of the referenced subject matter does not constitute prior art with regard to the present invention.

Modern engine blocks for passenger cars are often made of aluminum with cast iron liners. For the machining of these coated cemented carbides and Polycrystalline Diamond (PCD) inserts are generally used. Coated carbides can not be used at cutting speeds above 600 m/min and higher due to too high thermal load. PCD inserts function well but are not competitive due to high cost. Wet milling is used due to surface finish and chip evacuation. Emulsions used in machining are environmental and health problems and lead to a higher cost. Cutting data are; Cutting speed approximately 150–300 m/min and feed-rate/tooth around 0.15–0.30 mm/tooth. Depth of cut is between 0.2 and 1.5 mm.

In general engine blocks are produced in transfer lines and the time pressure is high. Often this operation is a bottleneck in the production. Milling cutters with close pitch are used which leads to change of about 30–40 inserts when they are worn out. One typical wear mechanism is built up edge which leads to a bad surface finish and failure of the cutting edge which leads to rapid wear. The main reason for tool change is surface finish and demands are high which leads to frequent tool changes.

Silicon nitride is a cutting tool material for machining of cast iron due to its good wear resistance and good high temperature properties. The properties of silicon nitride are greatly dependent on the density, and it has been found necessary to add sintering aids to silicon nitride in order to fully densify the body. Typically the sintering aids used are $Al_2O_3$, BeO, MgO, $TiO_2$, $ZrO_2$, $HfO_2$ and the oxides of the Group III elements of the periodic table scandium, yttrium, lanthanum, cerium, etc. The amount of sintering aid added is of the order of a few wt-%. The sintering aids form during sintering a glass phase, which facilitates the densification. Silicon nitride cutting inserts thus consist of beta silicon nitride in an intergranular glass phase.

It is an extremely high demand to develop tool solutions with a long tool life and less frequent tool changes. Dry machining of these type of applications is a strong demand in order to reduce costs, health hazards and environmental impacts.

SUMMARY OF THE INVENTION

A method of milling a material provides a silicon nitride based cutting tool insert, cuts at a cutting speed of 1000–3000 m/min, and feeds at a feeding rate of 0.05–0.5 mm/tooth to a cutting depth of 0.2–2 mm. The cutting tool insert produces a chip thickness of 0.09–0.17 mm. The material milled can comprise aluminum and cast iron.

DETAILED DESCRIPTION OF THE INVENTION

It has now surprisingly been found that by dry machining using silicon nitride inserts at a cutting speed above 1000 ml/min a longer tool life and increased productivity can be achieved. The problem with built up edge and wear disappeared surprisingly with these cutting data using silicon nitride inserts. The problems with built up edge remained with silicon nitride inserts in lower cutting speeds and the wear was also higher.

The present invention relates to machining of composite materials (aluminum in combination with cast iron) using silicon nitride inserts.

The cutting data is as follows:

Cutting speed=1000–3000, preferably 1100–2500 m/min;
Cutting feed/tooth=0.05–0.5, preferably 0.15–0.30 mm;
Cutting depth=0.2–2 mm, preferably 0.3–1 mm; and
Chip thickness=0.09–0.17 mm.

EXAMPLE

Face milling of engine block was performed under the following conditions:
Operation: Face milling, finishing
Work piece: Engine block
Material: Aluminum 8% Si and pearlitic grey cast iron
Cutting speed: See table
Feed rate/tooth: 0.26 mm
Depth of cut: 0.5 mm
Insert style: 28 pcs SBEX1203ZZ-11 and 4 pcs SBEN1203ZZ
Grade 1: Coromant grade 6090
Grade 2: WC-6% Co cemented carbide with 4 µm TiN+TiC-coating
Milling cutter: Auto FS 260.42 of diameter 250 mm Result: Tool life/insert is shown in the table. The tool life criterion was unacceptable surface finish including component frittering. The following results were obtained:

|  | Tool life/insert | |
| --- | --- | --- |
| Cutting Speed | Grade 1 Invention | Grade 2 Reference |
| 444 m/min | 10 pcs | 22 pcs |
| 1178 m/min | 60 pcs | not possible |
| 2356 m/min | 70 pcs | not possible |

With silicon nitride inserts a higher productivity and a longer tool life can be achieved, which can reduce problems, such as bottlenecks in the production and less frequent changes of tools. Another advantage is the ability to turn off coolant, which has environmental as well as cost advantages.

While the present invention has been described by reference to the above-mentioned embodiments, certain modifications and variations will be evident to those of ordinary skill in the art. Therefore, the present invention is to limited only by the scope and spirit of the appended claims.

What is claimed is:

1. A method of dry milling a material comprising:
   providing a milling cutter with a silicon nitride based milling insert;
   advancing the milling cutter relative to the material such that at least the majority of material removal is accomplished by contact with the milling insert;

cutting at a cutting speed of 1000–3000 m/min; and feeding to a cutting depth of 0.2–2 mm, wherein the material comprises aluminum and cast iron.

2. The method of claim 1, wherein the insert produces a chip thickness of 0.09–0.17 mm.

3. A method of dry milling a composite material, the method comprising:

providing a milling cutter with a silicon nitride based milling insert;

advancing the milling cutter relative to the material such that at least the majority of material removal is accomplished by contact with the milling insert;

cutting at a speed of 1100–2500 m/min; and feeding to a cutting depth of 0.2–2 mm.

4. The method of claim 3, wherein the cutting depth is 0.3–1.0 mm.

* * * * *